June 30, 1936.　　　V. BENDIX　　　2,046,053
BRAKE MECHANISM
Filed Jan. 28, 1930　　　3 Sheets-Sheet 1

INVENTOR
Vincent Bendix
BY
Clinton S. Janes
ATTORNEY

June 30, 1936.  V. BENDIX  2,046,053
BRAKE MECHANISM
Filed Jan. 28, 1930  3 Sheets-Sheet 2
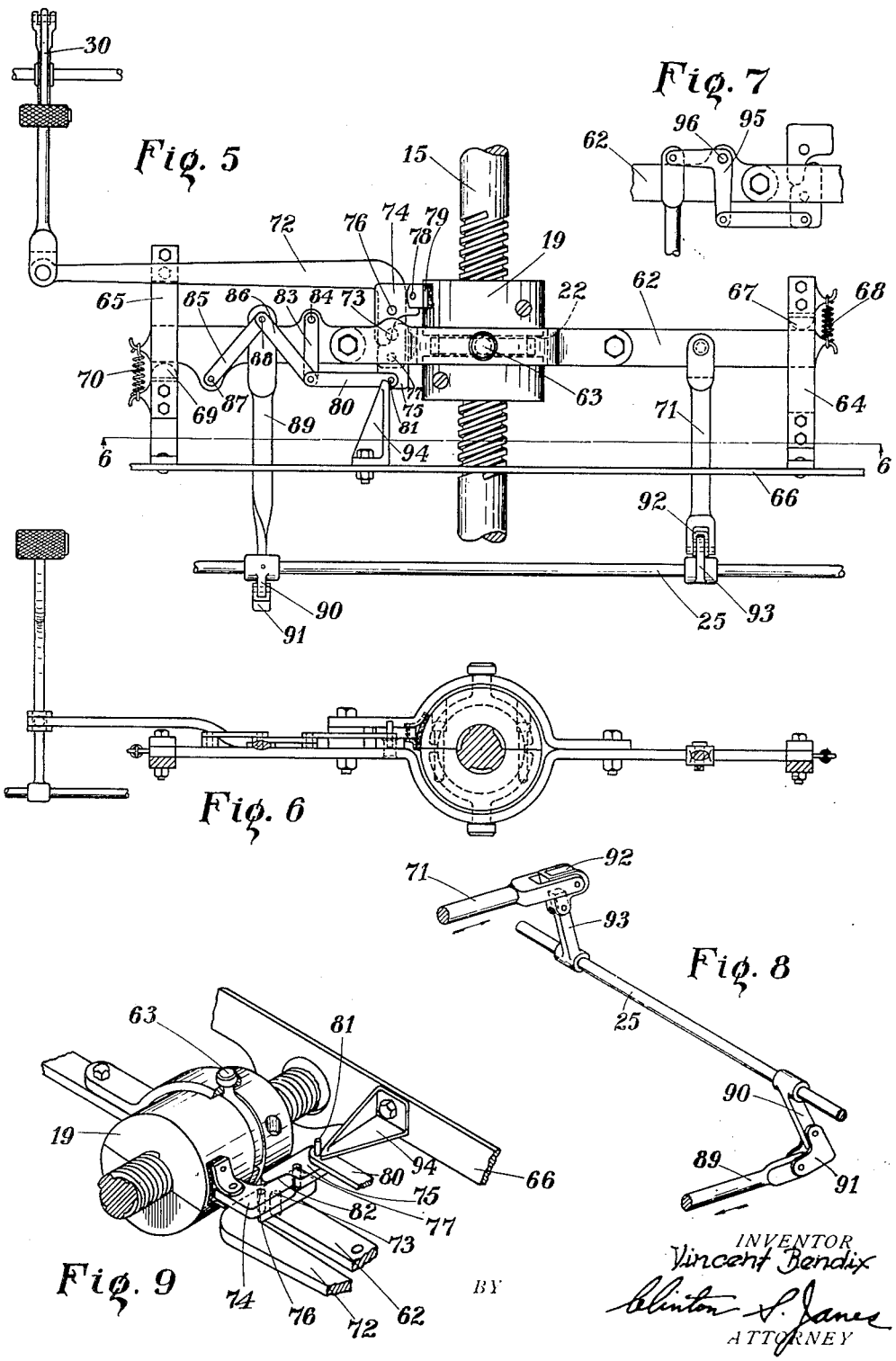
INVENTOR
Vincent Bendix
Clinton S. Janes
ATTORNEY June 30, 1936.  V. BENDIX  2,046,053
BRAKE MECHANISM
Filed Jan. 28, 1930  3 Sheets-Sheet 3
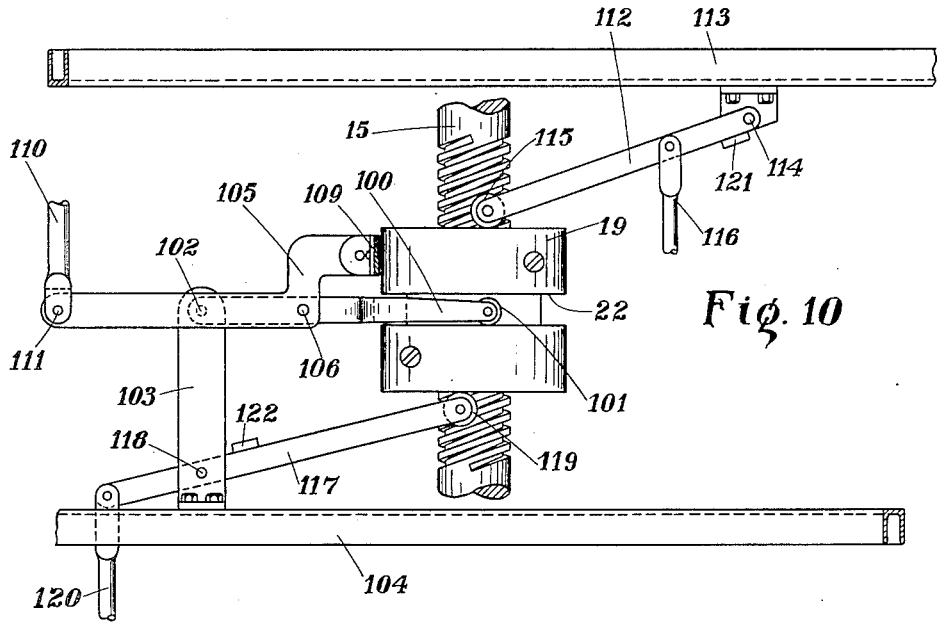
Fig. 10
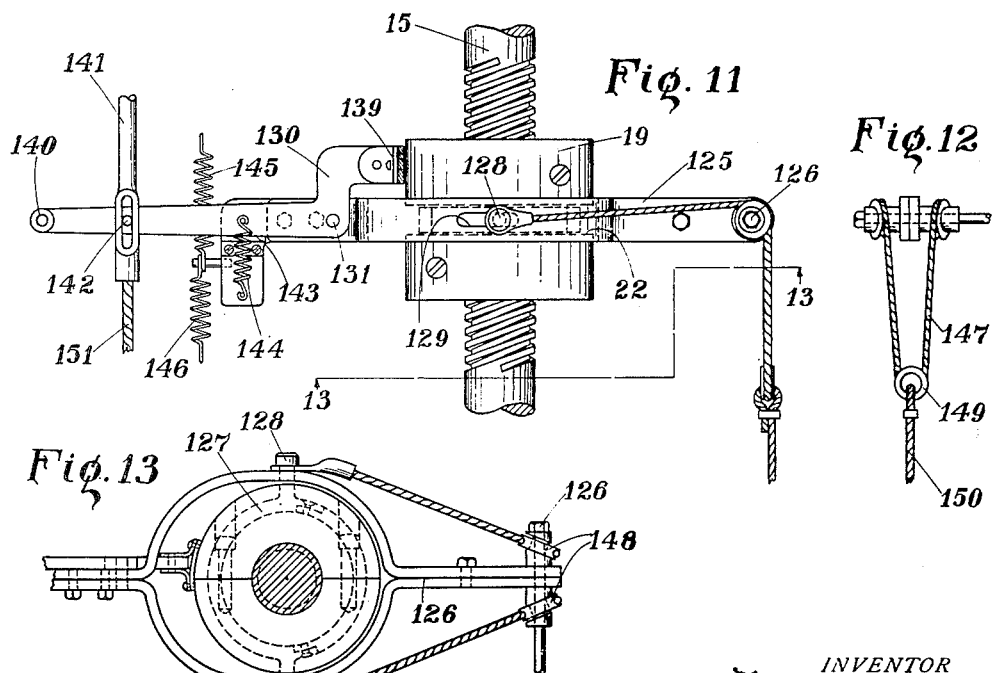
Fig. 11
Fig. 12
Fig. 13
INVENTOR
Vincent Bendix
BY
ATTORNEY Patented June 30, 1936

2,046,053

UNITED STATES PATENT OFFICE 2,046,053

BRAKE MECHANISM

Vincent Bendix, Chicago, Ill., assignor to Bendix Brake Company, South Bend, Ind., a corporation of Illinois Application January 28, 1930, Serial No. 423,995

9 Claims. (Cl. 188—140)

This invention relates to brake mechanism and more particularly to power brake mechanism for motor vehicles in which the brake-applying forces under the continuous control of the operator are derived from a moving part of the vehicle.

This application is a continuation in part of the application of Bendix, Serial Number 46,018, filed July 25, 1925.

One object of this invention is the provision of a novel power brake mechanism of the above type which is powerful and efficient and subject to accurate control by the operator.

Another object of the invention is the provision of such a power brake mechanism which is operative whether the vehicle is moving forward or backward.

A further object of the invention is to provide such a power brake mechanism in which a portion of the force exerted to apply the brakes is allowed to react on the controlling means.

Another object of the invention is to provide such a brake operating mechanism in which the brake mechanism is so interconnected with the controlling means that the operation of the brake mechanism modifies the effect of the controlling means.

A further object of the invention is the provision of such a brake operating mechanism in which the controlling device for the brakes is cushioned and modulated.

Further objects and advantages will appear to those skilled in this art from the following description taken in connection with the accompanying drawings in which:

Fig. 5 is a plan view of another embodiment of the invention;

Fig. 6 is a vertical cross section of the structure shown in Fig. 5 taken substantially on the line 6—6 of Fig. 5 looking in the direction of arrows;

Fig. 7 is a detail in plan view of a modified form of the operating mechanism of Fig. 5;

Fig. 8 is a detail in perspective of a portion of the operating connections shown in Fig. 5;

Fig. 9 is a detail in perspective of a portion of the controlling and operating connections of Fig. 5;

Fig. 10 is a plan view of another embodiment of the invention;

Fig. 11 is a plan view of a further embodiment of the invention;

Fig. 12 is a detail in side elevation of a portion of the operating means shown in Fig. 11; and Fig. 13 is a vertical section taken substantially on the line 13—13 of Fig. 11.

Figure 1:
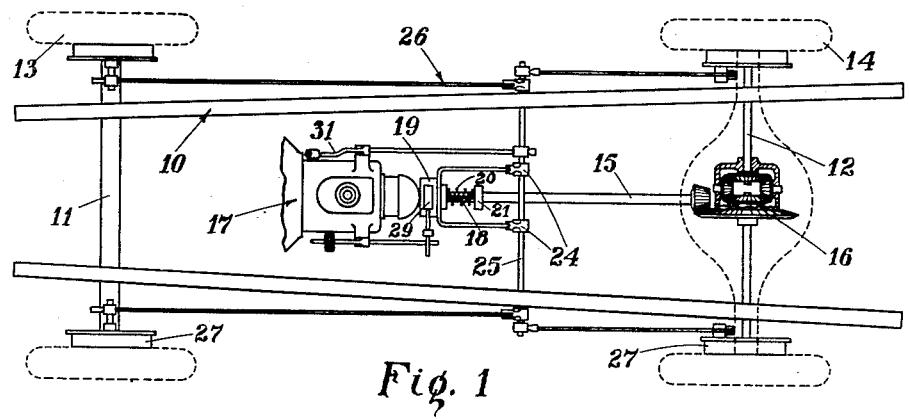
Fig. 1 is a plan view of an automobile chassis embodying one form of the present invention.

Referring first to Fig. 1 of the drawings, an automobile chassis 10 of conventional type is illustrated, provided with the usual front and rear axles 11 and 12 respectively, and front and rear wheels 13 and 14 respectively. A drive shaft 15 is connected to the rear axle 12 by suitable bevel gearing 16 and receives power from a motor and transmission mechanism of any suitable type indicated generally by numeral 17.

The forward end of drive shaft 15 is suitably threaded as shown at 18, and a nut member 19 is loosely threaded thereon, being retained at the forward end of the threads by means such as a spring 20 located between the nut 19 and a collar 21 fixed to the drive shaft 15. The nut 19 is provided with thrust surfaces which may be formed by a groove 22, and an operating yoke member 23 is adapted to engage with a running fit within said groove. Yoke 23 extends rearwardly and is pivotally connected to a pair of arms 24 fixed on a cross shaft 25. Cross shaft 25 is adapted to operate suitable connections indicated generally at 26 for actuating the front and rear wheel brakes 27 which may be of any preferred type.

Figure 2:
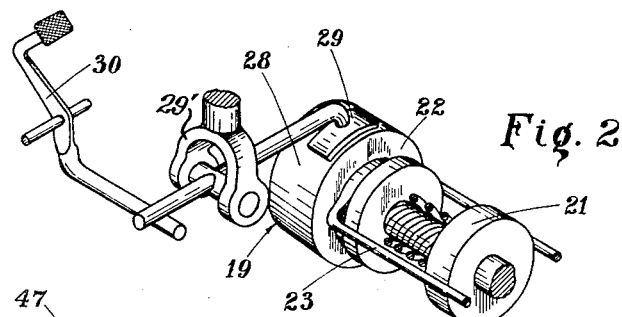
Fig. 2 is an enlarged detail perspective view of the controlling and operating mechanism illustrated in Fig. 1.

Nut member 19 is provided with a cylindrical exterior surface 28, and a control brake member 29 of any suitable form is adapted to cooperate therewith. Brake member 29 is pivoted in a fixed bearing yoke 29' as indicated in Fig. 2 and is controlled by the actuation of a brake pedal 30. Any preferred form of releasing means for the brake 29, either spring or weight operated, may be provided if so desired.

A hand brake operating lever 31 may be connected to the cross shaft 25 by any suitable lost motion connection in order to provide for manual application of the brakes when desired.

In operation, when the car is moving forward, the drive shaft 15 and nut 19 rotate constantly together since the nut is yieldably retained in its forward position by the spring 20. When it is desired to apply the brakes of the vehicle, the operator presses upon the pedal 30, causing the control brake 29 to engage the nut member 19 and retard its rotation. The consequent relative rotation between the nut member 19 and shaft 15 will cause the nut member to move rearwardly on such shaft, thus operating the yoke 23 in a direction to cause the application of the brakes. When the operator relieves the pressure on pedal 30, the spring 20 in conjunction with the usual release springs of the brake mechanism, not illustrated, will return the nut member 19 to its normal position and release the brakes, the inclination of the threads 18 being sufficient to allow such action.

It will be readily appreciated that the structure herein disclosed provides for the multiplication of the force exerted by the operator by any desired factor, depending on the mechanical design of the parts, and the application to the brake mechanism of such multiplied forces under the instant and accurate control of the operator.

Figure 3:
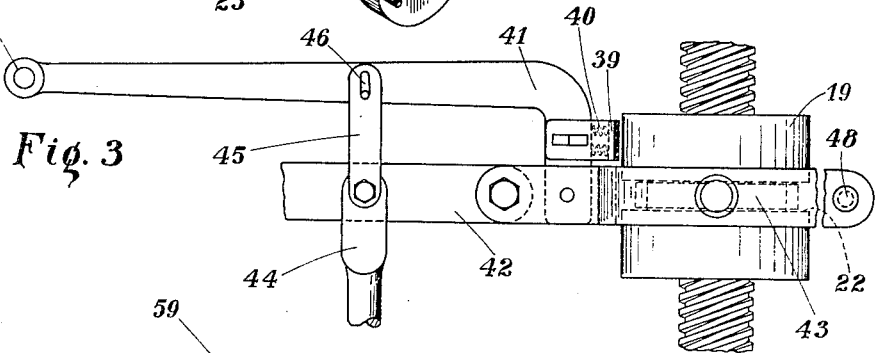
Fig. 3 is a detail in plan view of a modified form of controlling and operating means.

Fig. 3 illustrates an embodiment of this invention in which the control brake 39 is yieldably mounted as by means of springs 40 on bell-crank operating lever 41, pivoted on a transversely arranged yoke member 42. The yoke 42 is anchored at one end as indicated at 48 and is provided with any suitable form of engaging means such as a pair of forks 43 engaging in the groove 22 of nut member 19 to be operated thereby. Yoke 42 may be connected to actuate the brakes through a link member such as indicated at 44. Link 45 is preferably provided to connect the operating link 44 with the bell-crank lever 41 by means of a suitable lost motion connection such as 46, to allow the direct manual operation of the brakes when the vehicle is stationary. Lever 41 may be actuated by any suitable manual operating member, not illustrated, connected to the end 47 of said lever.

The operation of this embodiment is substantially similar to that previously described. Application of the control brake 39 by the operator causes the nut member 19 to move longitudinally and to carry yoke member 42 in a direction to apply the brakes. It will be noted, however, that inasmuch as the control brake 39 is mounted to travel longitudinally with the nut 19, that the relative motion between these members is simply a rotary movement and the brake does not impede the longitudinal movement of the nut. Moreover, the yielding mounting of the control brake acts to modulate the application thereof, and to prevent a sudden or jerky application of the brakes.

Figure 4:
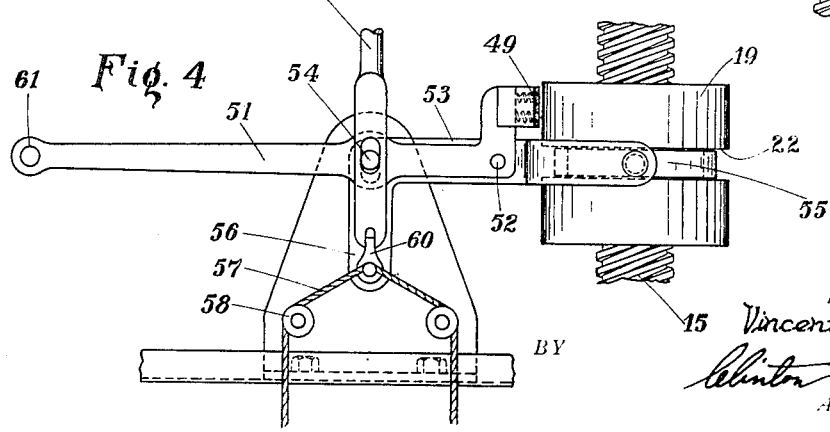
Fig. 4 is a similar view of a further modification thereof.

In the embodiment illustrated in Fig. 4 of the drawings, means are provided for applying the vehicle brakes whether the vehicle is moving forward or rearward. In this case, a bell-crank control lever 51 is pivoted at 52 on a second bell-crank lever 53 which in turn is pivoted at 54 to a fixed part of the chassis. The control lever 51 carries at its inner end a control brake 49 which is preferably yieldably mounted thereon and is adapted to cooperate with the nut 19. The lever 53 carries at its inner end a suitable fork 55 engaging in the groove 22 of said nut.

The free end 56 of lever 53 has suitably fixed thereto an operating cable 57 passing over a pair of stationary pulleys 58, and adapted to engage at its ends with suitable brake operating mechanism, not illustrated. A hand-operating element 59 may be connected to the cable 57 through a link 60 to operate the brakes manually when desired.

When the operator swings the control lever 51 upwardly as shown in Fig. 4 by any suitable connection to the free end 61 of said lever, the control brake 49 will retard the rotation of nut 19. The nut is thus caused to travel longitudinally and thereby swing the bell-crank lever 53 in a direction depending upon the direction of the rotation of shaft 15. It will be readily appreciated that one strand or the other of the cable 57 will be placed under tension by the swinging of lever 53 in either direction, and this tension is used to actuate the brakes in any preferred manner.

In the embodiment of the invention illustrated in Figs. 5 and 6, a cross-bar 62 is arranged to be actuated by the nut 19 by suitable means such as fork members 63 engaging in the groove 22 of said nut. The ends of said cross-bar are slidingly mounted in a pair of guides 64 and 65 respectively, fixed to a cross member 66 of the chassis. Guide member 64 is provided with a yielding abutment 67 limiting forward motion of the end of bar 62 engaging therein, said bar being normally retained against the abutment 67 by means such as a coil spring 68. The guide member 65 is provided with a correspondingly yielding abutment 69, limiting rearward motion of the bar 62 engaging therein, the bar being normally held against abutment 69 as by a spring 70. It will thus be seen that forward motion of nut member 19 will carry the left hand end of bar 62 in a forward direction, while rearward motion of said nut will carry the right hand end of the bar 62 rearwardly. The right hand end of bar 62 is connected by means of a suitable push link 71 with the brake operating shaft 25, so that rearward motion thereof will swing the shaft in a direction to apply the brakes.

A bell-crank lever 72 suitably linked to the brake pedal 30 is pivoted at 73 on the cross bar 62, and carries a pair of equalizing levers 74 and 75 pivoted thereto at 76 and 77 respectively, on opposite sides of the pivot 73. Equalizing lever 74 carries the control brake 79 pivoted thereto at 78 in position to engage the braking surface of nut 19, and equalizing lever 75 is attached at its outer end to a link 80 by means of a pivot pin 81. The inner ends of the equalizing levers 74 and 75 overlap and are cut away in order to form bearing surfaces at 82 which are adapted to rock on each other and cause a balance to be effected between the force exerted on the brake member 79 and the pivot pin 81.

Link 80 is pivoted at its free end to a link 83 hinged to the bar 62 at 84, and also to the free end of a toggle formed of a pair of toggle arms 85 and 86 anchored to the bar 62 at 87. The hinge 88 of the toggle is operatively connected to a drag link 89 which is adapted to operate the brake actuating shaft 25 by means of a crank arm 90 suitably fixed thereon. Suitable lost motion connections such as illustrated at 91 and 92 (Fig. 8) are provided between the links 89 and 71 and the cranks 90 and 93 for the cross shaft 25 so that neither connection interferes with the operation of the other.

A bracket 94 is fixed to the cross member 66 in position to engage at its end with an extended portion of the pivot pin 81 and prevent motion of the pivot pin to the left in Fig. 5 until said pin has moved forwardly sufficient to disengage itself therefrom.

In the operation of this embodiment of the invention, with the driving shaft 15 and nut 19 rotating together, operation of the brake pedal 30 will swing the bell-crank lever 72 in a direction to cause engagement of control brake 79 with the surface of nut member 19. At the same time, an equal force will be transmitted through equalizing levers 74 and 75 through the link 80 to the toggle 85, 86, causing a tension to be applied to the drag link 89, which tends to actuate the cross shaft 25 in a direction to apply the brakes. If the vehicle is moving forward at this time, the rotation of shaft 15 will cause the nut member 19, when so retarded, to move forward and carry the left hand end of bar 62 forward and operate the drag link 89 through the connections 87 and 84 and the link mechanism attached thereto to apply the brakes by the force derived from the rotation of such shaft.

During the application of the brakes by the servo mechanism as above described, the braking reaction tends to straighten the toggle members 85, 86, applying a compressive force to the link 80 which tends, through the balancing members 74 and 75 and pins 77 and 76, to rotate the bell crank lever 72 in a counter-clockwise direction about pivot 73. This reactive tendency on the lever 72 is transmitted to the brake pedal 30 and hence to the operator. It will thus be seen that a factor of the reaction of the brake applying forces is caused to react against the operator whereby he is enabled to accurately gauge the brake applying forces as generated by the servo means. In other words, the force applied by the operator to the brake pedal is balanced against the braking reaction, the mechanical advantage of the controlling means being suitably determined by the arrangement and dimensions of the levers and linkages.

It will be noted that this balancing means is rendered inoperative during rearward braking, by the engagement of the pin 81 on link 80 with the bracket 94. This is for the purpose of preventing idle motion of the levers 74 and 75 at this time when the brake applying forces are transmitted through the push link 71.

Should the vehicle be moving rearwardly at the time, the nut member 19 will carry the right hand end of bar 62 rearwardly and apply the brakes through the push link 71. At this time, the pivot pin 81 is engaged by the bracket 94 to prevent the idle swinging of equalizing lever 75, and thus allow the proper application of the control brake 79 by the operator.

In the modification of this structure illustrated in Fig. 7, the toggle 85, 86 is replaced by a bell-crank lever 95 pivoted at 96 to the bar 62 and operating in a substantially similar manner to said toggle mechanism.

In Fig. 10 there is illustrated the drive shaft 15 and nut 19 having a groove 22 therein as previously described. A yoke member 100 preferably provided with anti-friction rolls 101 arranged to engage loosely in said groove, is hinged at 102 to a bracket 103 fixed to a cross member 104 of the chassis. A control lever 105 is hinged at 106 to the yoke member 100 and carries pivoted thereto a control brake 109 adapted to be applied to the surface of nut 19 by a manually operated link 110 pivoted thereto at 111. A lever member 112, hinged to a cross member 113 of the chassis at 114, has its free end arranged to bear on the forward end of nut 19, preferably by means of an anti-friction roller 115, and is connected intermediate thereof to a drag link 116 which is adapted to extend rearwardly and operate a brake actuating shaft in any preferred manner.

A second lever member 117 is pivoted to the bracket 103 at 118 and is adapted to bear at its free end on the rear end of nut 19 by means of a roller 119. Lever 117 is extended beyond the pivot 118 and has connected thereto a drag link 120 which is also connected to actuate a brake operating shaft in any suitable manner. It will be understood that the drag links 116 and 120 may be connected through suitable lost motion connections to the brake mechanism if so desired, but such connections are not essential in view of the fact that the levers simply rest against the ends of the nut member 19, so that one lever does not interfere with the operation of the other.

Suitable stops 121 and 122 may be provided to retain the levers 112 and 117 in normal position.

When the control brake 109 is applied to the rotating nut 19 by the operator, longitudinal motion of the nut 19 will operate lever 112 or lever 117, depending on the direction of rotation of shaft 15, and motion of such lever is effective through its corresponding link member to operate the brake mechanism in a direction to apply the brakes.

In the structure illustrated in Figs. 11, 12, 13, a compound lever 125, pivoted at 126, is adapted to extend around a yoke member 127 mounted in the slot 22 of nut member 19. Said yoke member has pintles 128 extending through slots 129 in said lever and connecting the yoke and lever for longitudinal motion in unison. An operating bell-crank lever 130 is pivoted at 131 to the lever 125 and carries pivoted thereto a control brake 139 adapted to engage the surface of nut 19. The control lever 130 is adapted to be operated by a suitable manual connection at its outer end 140, or may be operated by a ratchet brake handle through a link 141 having a lost motion connection 142 therewith. The control lever 130 is normally retained against a stop 143 on lever 125 by means such as a spring 144. The lever 125 is yieldably retained in normal position as by centering springs 145 and 146.

An operating cable 147 is attached at its ends to the extending pintles 128. Said cable passes over pulleys 148 mounted on the pivot 126, and has a bight provided with a ring 149 attached to a brake operating cable 150 adapted to operate the brake mechanism in any suitable manner. A cable 151 may also be attached to the link 141 operated by the ratchet brake lever in order to operate the brakes directly when so desired.

In operation, when the vehicle is in motion and the operator causes the control brake 139 to engage and retard the nut 19, longitudinal motion of the nut will swing the lever 125 about pivot 126 in one direction or the other, depending on the direction of rotation of shaft 15. At the same time, the yoke member 127 is carried by the nut 19 longitudinally along the shaft, thus causing the ends of cable 147 to be drawn away from the pivot 126. The motion of cable 147 is transmitted through cable 150 to operate the brakes in any preferred manner.

It will be noted that the slot 129 in lever 125 permits the translation of the fork member 128 as above described.

Although certain preferred embodiments of the present invention have been shown and described, it is to be distinctly understood that the structure disclosed is not exclusive, and various modifications thereof will suggest themselves to those skilled in this art, and various changes may be made in the relations of the parts without departing from the spirit of the invention. Reference will therefore be had to the claims hereto appended for a definition of the scope of the invention.

What is claimed is:

1. A force-multiplying brake operating mechanism for motor vehicles including a power member driven from a rotating part of the vehicle, an actuating member for the brakes mounted thereon and normally rotating therewith, said members having cooperating means whereby relative rotation causes relative translation thereof, means for restricting the rotation of the actuating member, positive means continuously under the control of the operator for operating said restricting means, and means whereby the consequent translation of the actuating member is caused to apply the brakes with forces which are substantially constant multiples of the forces exerted by the operator.

2. A force-multiplying brake operating mechanism for motor vehicles including brake-applying means, a member adapted to be rotated by motion of the vehicle, an actuating member threaded thereon and normally rotating therewith, means for retarding the rotation of said actuating member, a manually operated control member, a normally rigid operative connection between the control member and retarding means, and connections between the actuating member and brake-applying means whereby longitudinal motion of the actuating means in one direction due to relative rotation between the rotatable member and actuating member, will apply the brakes with forces having a substantially constant ratio to the forces applied to the control member.

3. A force-multiplying brake operating mechanism for motor vehicles including a power member driven from a rotating part of the vehicle, an actuating member mounted thereon and normally rotating therewith, said members having cooperating means whereby relative rotation causes relative translation thereof, a spring mounted control brake for said actuating member, manual means for applying said control brake, and operative connections between the actuating member and the vehicle brake mechanism.

4. A force-multiplying brake operating mechanism for motor vehicles including a power member, an actuating member mounted thereon and normally rotating therewith, said members having cooperating means whereby relative rotation causes relative translation thereof, brake applying mechanism, and a pair of reversely operative connections between the actuating member and the brake applying mechanism for transmitting motion of the actuating member in opposite directions to the brake applying mechanism in a direction to apply the brakes.

5. A force-multiplying brake operating mechanism for motor vehicles including a power actuating mechanism driven from a rotating part of the vehicle, brake operating means adapted to be actuated thereby, a pair of reversely operative connections between the power member and the brake operating means selectively operated during forward and reverse movement of the vehicle, manual controlling means for the power member, and connections between the power member and the controlling means for causing a portion of the brake applying forces during forward braking to react against the manual controlling means.

6. A force-multiplying brake operating mechanism for motor vehicles including a power member driven from a rotating part of the vehicle, brake operating means adapted to be actuated thereby, manual controlling means for the power member and connections between the power member and the controlling means for balancing the forces exerted by the controlling means during forward braking against a factor of the brake applying forces, and means for rendering said balancing means inoperative during rearward braking.

7. A force-multiplying brake operating mechanism for motor vehicles including a power actuating member driven from a rotating part of the vehicle, brake operating means adapted to be actuated thereby, manual controlling means for the power member, said manual controlling means being mounted on an element of the power actuating member and so arranged that the brake applying motion of the power actuating member tends to release the manual controlling means.

8. A force-multiplying brake operating mechanism for motor vehicles including a nut threaded on the driving shaft of the vehicle normally rotating therewith, a yoke member swivelled on said nut, a control brake for said nut pivoted on said yoke member, manual means for operating said control brake, and operative connections between said yoke and said brake operating mechanism.

9. A force-multiplying brake operating mechanism for motor vehicles including a nut threaded on the driving shaft of the vehicle and normally rotating therewith, a yoke member swivelled on said nut, a manually controlled lever pivoted on said yoke, a pair of equalizing levers pivoted on said manually controlled lever with adjacent ends in cooperative relation, a control brake for said nut mounted on the free end of one equalizing lever, operative connections between the yoke and brake operating mechanism, and a connection between the free end of the other equalizing lever and said operative connections whereby a factor of the brake applying forces is balanced against the force of application of the control brake.

VINCENT BENDIX.